United States Patent
Peeters et al.

(10) Patent No.: US 6,715,274 B2
(45) Date of Patent: Apr. 6, 2004

(54) ACCELERATOR ROLLER FOR WINDROW MERGER

(75) Inventors: Kenneth J. Peeters, Bear Creek, WI (US); Gregory L. Landon, Shawano, WI (US)

(73) Assignee: H&S Manufacturing Co., Inc., Marshfield, WI (US)

( * ) Notice: Subject to any disclaimer, the term of this patent is extended or adjusted under 35 U.S.C. 154(b) by 0 days.

(21) Appl. No.: 10/054,594

(22) Filed: Jan. 22, 2002

(65) Prior Publication Data

US 2003/0136098 A1 Jul. 24, 2003

(51) Int. Cl.[7] .................... A01D 76/00; A01D 78/00; A01D 80/00; A01D 84/00
(52) U.S. Cl. ............................. 56/376; 56/366
(58) Field of Search ................... 56/376, 366, 370, 56/15.1, 15.5, 15.8, 16.3, 365, DIG. 21

(56) References Cited

U.S. PATENT DOCUMENTS

| | | | |
|---|---|---|---|
| 2,761,270 A | * | 9/1956 | Blaser et al. ............ 56/370 |
| 3,680,290 A | | 8/1972 | Laverne ...................... 56/1 |
| 4,033,518 A | | 7/1977 | Fleming et al. ............ 241/47 |
| 4,283,904 A | | 8/1981 | Aron ........................ 56/13.9 |
| 4,757,672 A | | 7/1988 | Roger ........................ 56/192 |
| 4,862,685 A | | 9/1989 | Gasseling et al. ............ 56/372 |
| 4,926,625 A | | 5/1990 | Laquerre .................... 56/376 |
| 5,203,154 A | * | 4/1993 | Lesher et al. ................ 56/366 |
| 5,251,431 A | | 10/1993 | Shoop ........................ 56/366 |
| 5,301,496 A | * | 4/1994 | Sudbrack et al. ............ 56/366 |
| 6,164,052 A | | 12/2000 | Golay ........................ 56/372 |

* cited by examiner

*Primary Examiner*—Árpád Fab Kovács
(74) *Attorney, Agent, or Firm*—Patterson, Thuente, Skaar & Christensen, P.A.

(57) ABSTRACT

A towable windrow merger including a pickup head for raising the crop material form the ground surface and a transverse conveyor assembly for laterally displacing the crop material. The transverse conveyor assembly includes an accelerator roller system, supported by the frame and at the outboard discharge end of the transverse conveyor assembly. The accelerator roller has a movable element for receiving and propelling the windrow material beyond the discharge end of said transverse conveyor and imparting a vertical as well as a horizontal velocity to the windrow material to fluff it.

19 Claims, 5 Drawing Sheets

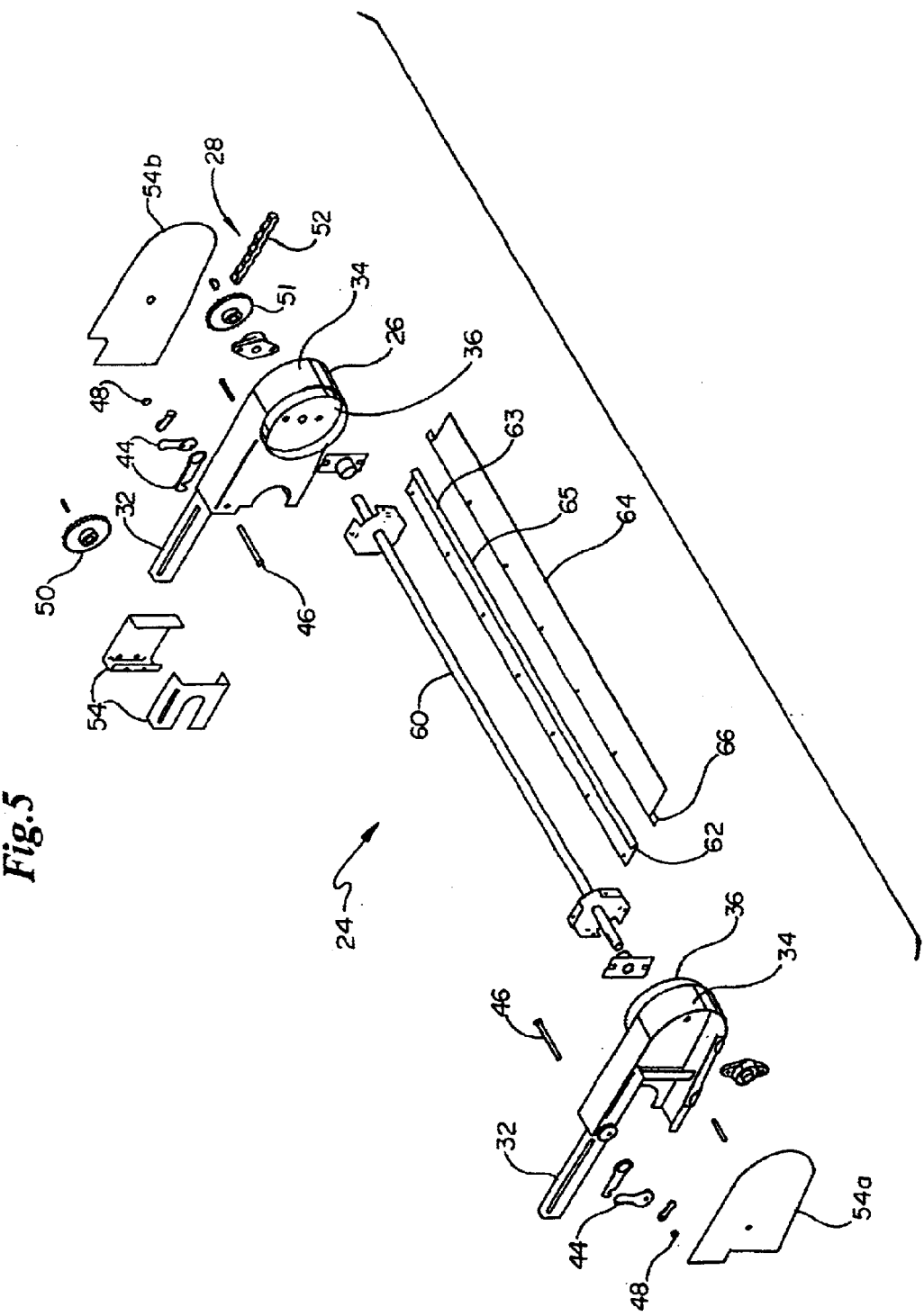

ACCELERATOR ROLLER FOR WINDROW MERGER

TECHNICAL FIELD

The present invention relates generally to an apparatus for laterally displacing crop material on the ground. More particularly, to an improved discharge system for a windrow merger device, which laterally displaces and fluffs one or more windrows in a field.

BACKGROUND OF THE INVENTION

When a feed or grain product is ready to be harvested, the product may be too moist for further processing after cutting. In such cases the product is typically cut and left in long generally parallel windrows in the field. The product is left in the windrows to afford drying of the product by the wind and sun. When the product has dried sufficiently, it is picked up for storage or further processing.

There is an economic need to make the harvest as quick and efficient as possible. In order to minimize the number of windrows that must be picked up, it makes economic sense to merge one or more windrows into a single windrow. The single windrow may then be picked up when the material has dried sufficiently.

Further, there is a danger that crop material left in windrows will compact to such an extent that the center of the windrow never dries. In order to accelerate the drying process, it makes economic sense to fluff the windrow. The looser packed windrow dries faster so it can be removed from the field sooner.

Accordingly, there is a need in the industry for an improved discharge system for a windrow merger that will minimize the total number of windrows as well as fluff the crop material during the lateral displacement process. It is desirable that the improvement not substantially increase the width of the windrow merger as to hamper the convenience of travel on public highways. Further, the improvement must handle the windrow material in an efficient manner, without plugging up the windrow merger thereby allowing continuous operation.

SUMMARY OF THE INVENTION

The accelerator roller for a windrow merger of the present invention substantially meets the aforementioned needs of the industry. The accelerator roller of the windrow merger comprises an improvement to windrow mergers in which the crop material is dropped at the discharge end of the windrow merger transverse conveyor. The accelerator roller in the improved windrow merger propels the crop material from the discharge end of the transverse conveyor, extending the effective lateral displacement ability of the windrow merger. The result is fewer windrows in the field that need to be picked up. Further, the accelerator roller is designed so that the windrow material is decompacted by the accelerator as it is displaced. By fluffing the compacted crop material in the windrow, total drying time is reduced. Further, this improvement to the windrow merger is compactly designed so as to minimally increase apparatus width while increasing the effective lateral displacement of the windrow material.

The present invention is an improved windrow merger apparatus with an accelerator roller assembly for increasing the lateral displacement of the windrows while fluffing the windrow material. The accelerator roller assembly extends outboard of the discharge end of the windrow merger transverse conveyor. The accelerator roller frame mounts to the outboard frame of the windrow merger transverse conveyor assembly. The accelerator roller is chain driven by way of the outboard transverse conveyor. Rotatable paddles, which extend radially from the accelerator roller shaft, propel and fluff the windrow material during the displacement process.

The present invention is a windrow merger being a machine for merging crop material disposed in a windrow on the ground surface, the windrow merger being situated on a frame which supports a tongue for towing, a pickup head for raising the crop material from the ground surface and a transverse conveyor assembly for laterally displacing the crop material and said transverse conveyor assembly, including an accelerator roller system, supported by said frame and in closely spaced relation with a outboard discharge end of said transverse conveyor assembly, and having a movable element for receiving and propelling the windrow material beyond the discharge end of said transverse conveyor. The present invention is further a method of displacing a windrow and an accelerator roller system.

BRIEF DESCRIPTION OF THE DRAWINGS

FIG. 5 is an exploded perspective view of the present invention.

DETAILED DESCRIPTION OF THE DRAWINGS

Figure 1:
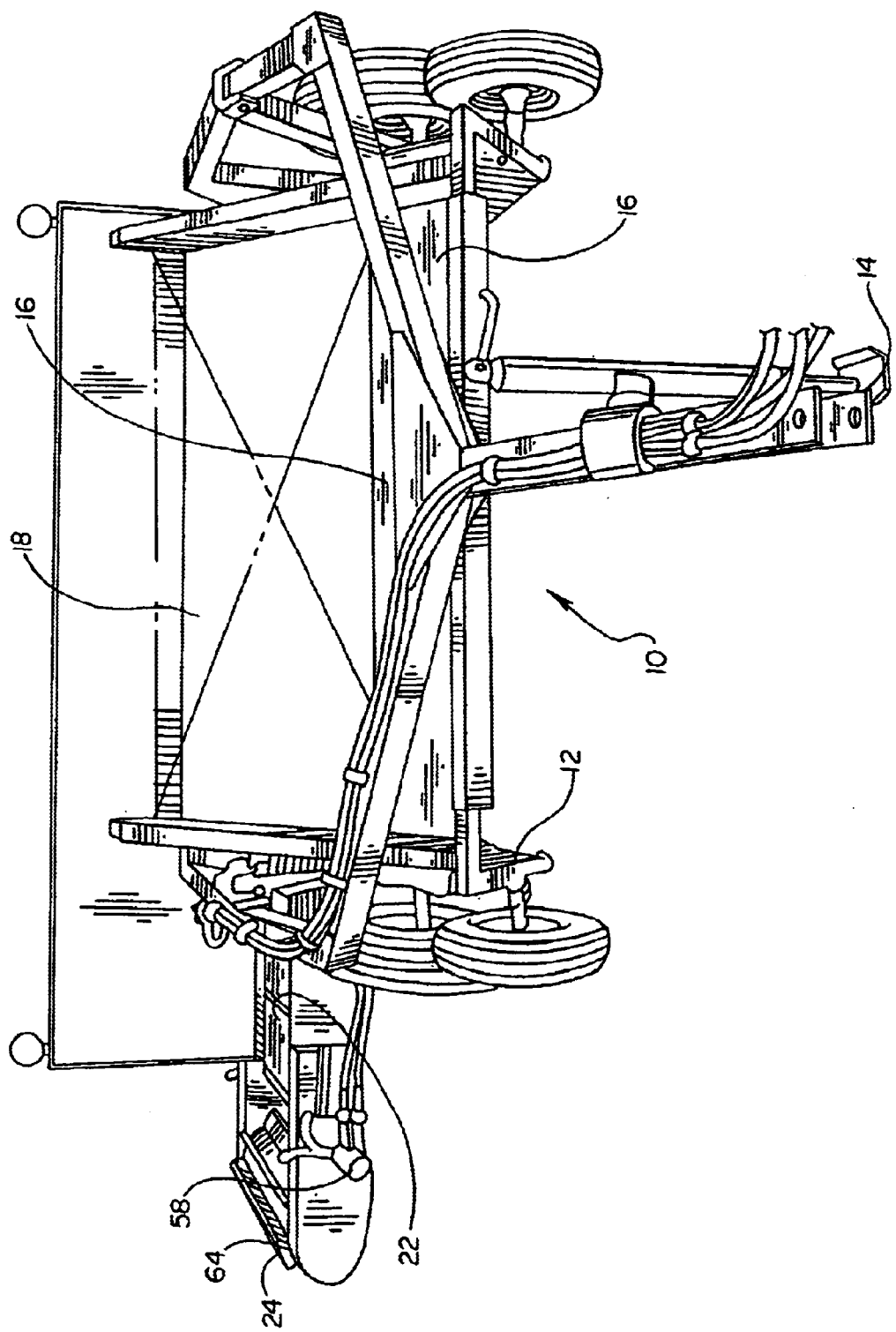
FIG. 1 is a front perspective view of an improved windrow merger with the present invention mounted on the left outboard side of the transverse conveyor assembly.
Figure 2:
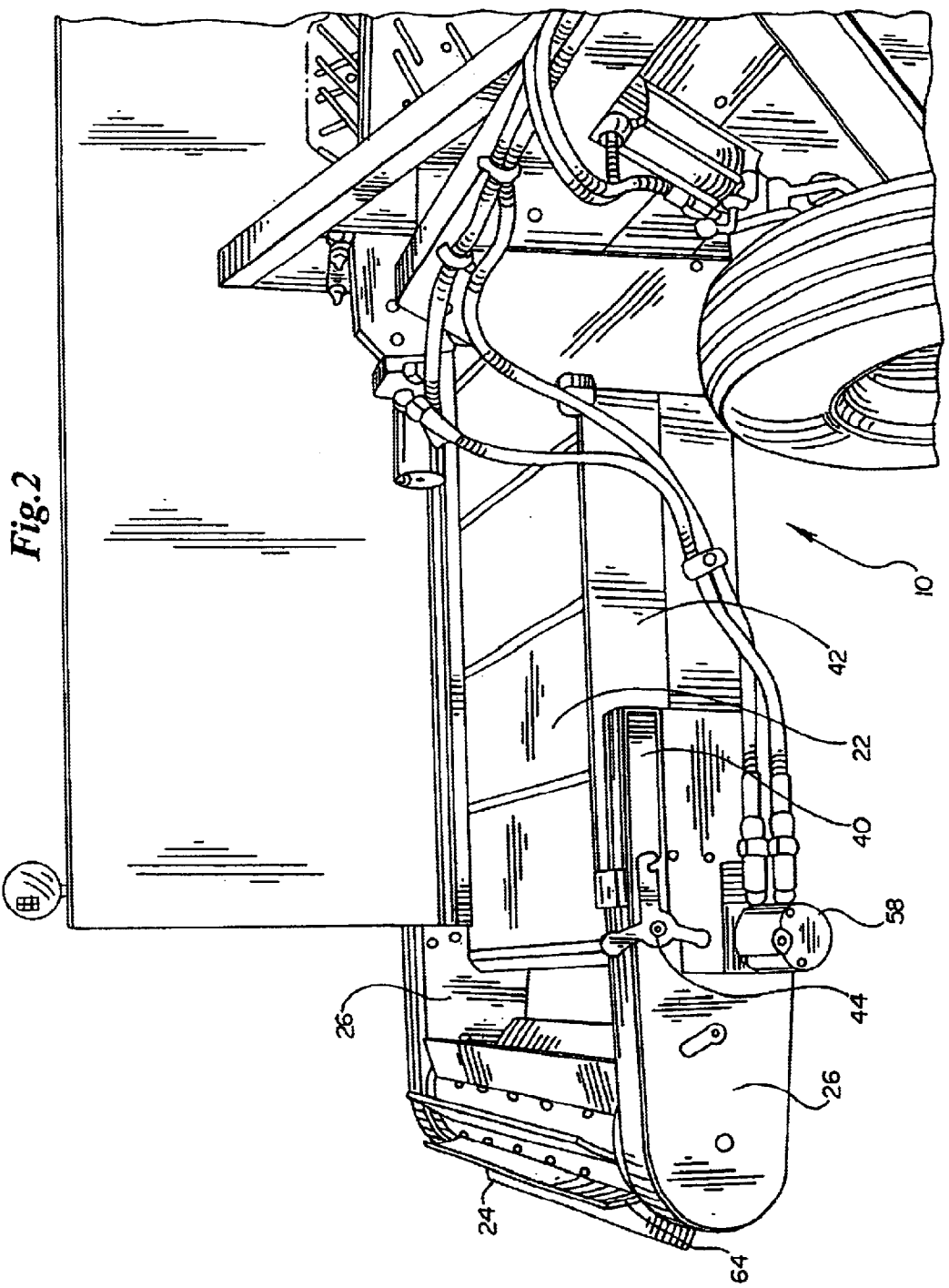
FIG. 2 is a front perspective view of the present invention as mounted on a windrow merger.
Figure 3:
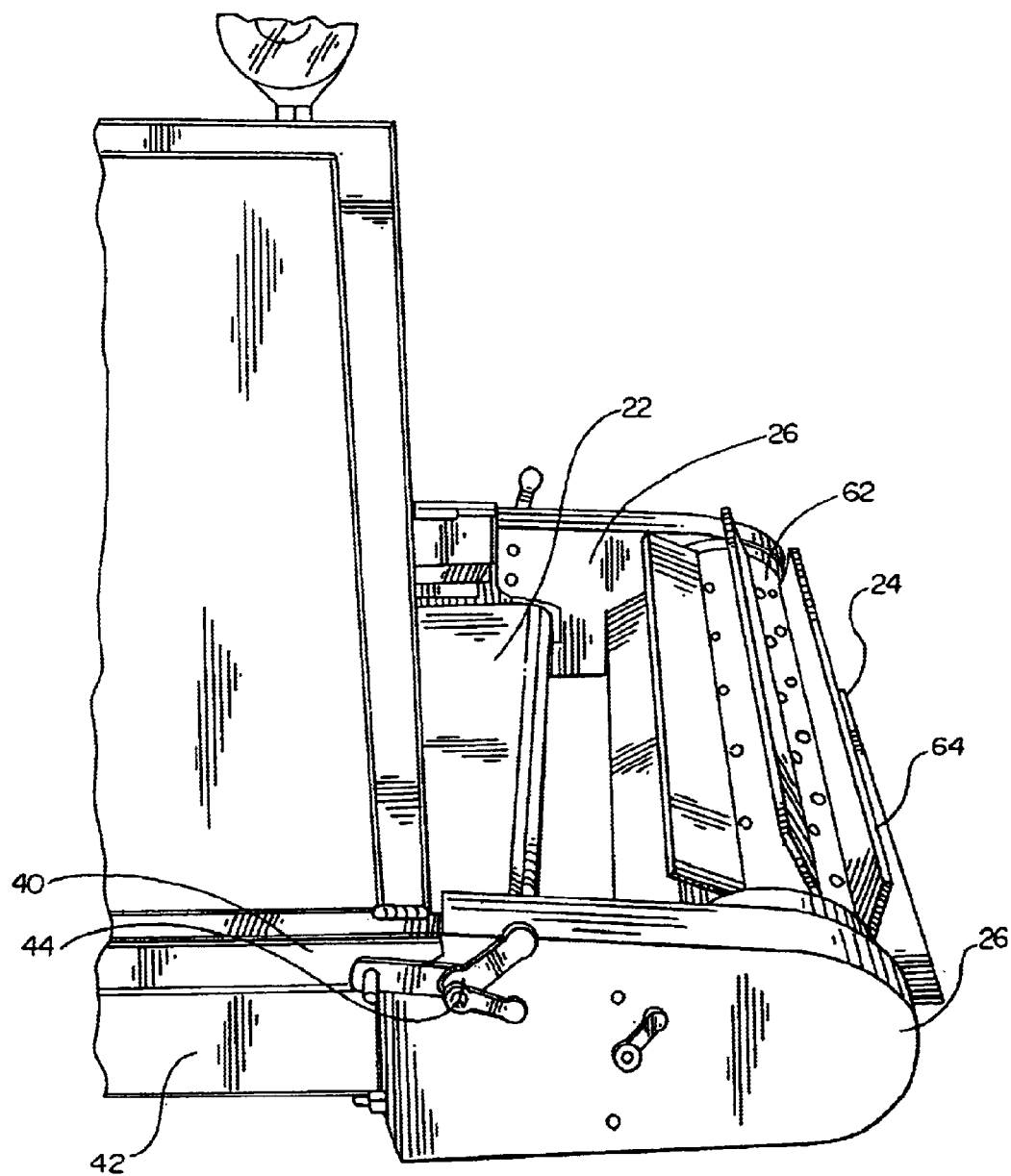
FIG. 3 is a rear perspective view of the present invention as mounted on a windrow merger.
Figure 4:
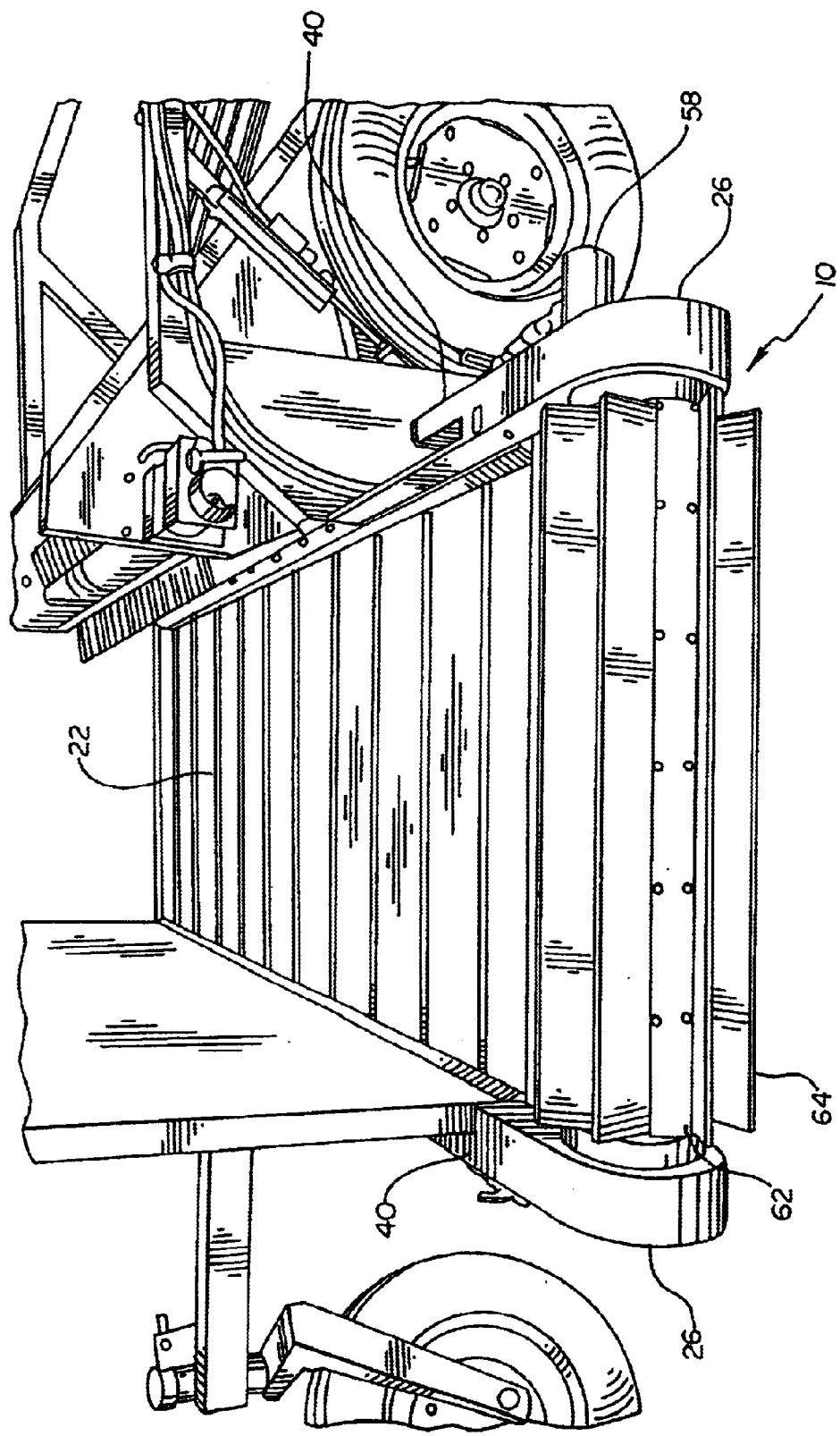
FIG. 4 is a side perspective view of the present invention as mounted on a windrow merger.

The improved windrow merger of the present invention is shown generally at 10 in FIGS. 1–4. The windrow merger 10 is a towable farm implement. Referring to FIG. 1, the windrow merger frame 12 supports an elongated tongue 14 by which the windrow merger 10 can be coupled to a tractor or similar device (not shown). The windrow merger frame 12 also supports a pickup head assembly 16 which lifts the windrow crop material off the ground and transfers the material to the rear of the windrow merger 10 by way of the pickup conveyor system 18. The crop material is deposited by the pickup conveyor system 18 onto the transverse conveyor assembly 22 which laterally displaces the crop material before depositing it back in the field, forming a new windrow generally parallel to the original pickup windrow.

The present invention is an accelerator roller system 24 which is attachable to the outboard discharge end of the transverse conveyor assembly 22. Instead of depositing the crop material directly at the end of the transverse conveyor assembly 22, the accelerator roller system 24 propels the crop material vertically and horizontally away from the windrow merger 10.

The accelerator roller system 24 is comprised of three major components. The accelerator mounting brackets 26, the drive system 28, and the roller assembly 30.

The accelerator mounting brackets 26 are the first major component of the accelerator roller system 24. The accelerator mounting brackets 26 are preferably one structure comprised of three sections: the mounting tubes 32, the drive support 34 and the roller support 36 (see FIG. 5). Other mounting means could as well be utilized. In the preferred embodiment, the accelerator mounting bracket 26 is equipped with two essentially parallel mounting tubes 32 which slide into a pair of essentially parallel receptor tubes 40 welded on to outside faces of the transverse conveyor side rails 42. The inner dimension of the square receptor tube 40 is slightly less than the outer dimension of the square mounting tubes 32. The accelerator roller system 24 is then locked into place adjacent the outboard transverse conveyor assembly 22 by way of a latching mechanism 44 comprised of carriage bolt 46, and latch with nut 48.

The second major component of the accelerator roller system 24 is the drive system 28, which is comprised of an inboard sprocket 50 and outboard sprocket 51, a chain 52 and shields 54a and 54b (see FIG. 5). The drive system 28 depends on the transverse conveyor assembly 22, where the transverse conveyor shaft (not shown) is powered by the transverse conveyor motor 58. The drive system 28 is located along the forward transverse conveyor side rail 42, with the first sprocket 50 mounted on the outboard transverse conveyor drive shaft (not shown) which runs along the same axis as the outboard transverse conveyor motor 58 (FIGS. 1, 2, 4), and the second sprocket 51 mounted to the accelerator roller shaft 60. The accelerator roller shaft extends through the drive support section 34 of the accelerator mounting brackets 26. The sprockets 50 and 51 are connected by a chain 52. The drive system 28 rotates the accelerator roller assembly 30 in the same direction as the transverse conveyor 22. The outboard sprocket 51 and chain 52 are positioned and shielded by accelerator mount shield 54b and the outboard end of the accelerator mounting bracket 26. The forward sprocket 50 and chain 52 is protected by forward sprocket shield 54a. Other means of imparting rotary motion to the roller system 24 could as well be used, such as a drive taken off the tractor PTO.

Motor 58 is preferably hydraulically driven. Hydraulic power is typically derived from the tractor that is towing the windrow merger 10. Motor 58 could as well be powered by the tractor PTO or a gear train driven by the wheels of the merger 10.

The third major component of the accelerator roller system 24 is the roller assembly 30, which is mounted on the accelerator roller shaft 60. The roller assembly 30 is comprised of the accelerator plates 62, the accelerator paddles 64 and the paddle base 66. A plurality of narrow metal accelerator plates 62, with a slotted lip 63 on the outboard edge, radiate from the accelerator roller shaft 60. The metal paddle base 66 is fixed within the lip 63 of accelerator plate 62 with the paddle 64 extending through the slot 65 on the lip 63. The paddles 64 are preferably made of a durable rubber although other materials may be used as well. The paddles 64 extend substantially coextensive with the roller shaft 60.

In operation, the windrow crop material, situated in long parallel rows in the field, is raised from the surface of the field by the pickup head assembly 16 and transported towards the rear of the windrow merger 10 where it is deposited on the transverse conveyor assembly 22. The windrow crop material is carried laterally to the discharge end of the transverse conveyor assembly 22. As the material drops off the end of the transverse conveyor assembly 22 it comes in immediate contact with the paddles 64 of the accelerator roller system 24. The paddles 64, extend parallel with the outboard edge of the conveyor drive shaft and are of approximately equal width as the transverse conveyor 22 so as to catch substantially all of the windrow crop material. The accelerator drive system 28 rotates the plurality of radially extending paddles 64 which imparts upon the windrow material an increased velocity sending the crop material up and outward from the discharge end of the transverse conveyor assembly 22. The accelerator roller system 24 efficiently utilizes the power of the windrow merger transverse conveyor motor 58 through the use of a sprocket 50 and chain drive 52. The accelerator roller system 24 increases the lateral displacement of the windrow crop material without a comparable extension of the transverse conveyor assembly 22. Because the paddles 64 impart a vertical force as well as horizontal, the windrow crop material fluffs or aerates as it falls to the ground thus improving the drying time.

Those skilled in the art will recognize that there are numerous variations and modifications in its scope. Accordingly, the foregoing description should be considered illustrative of the invention and not deemed to limit its scope.

What is claimed is:

1. A windrow merger for merging crop material disposed in a windrow on the ground surface, including a frame, a tongue for towing, a pickup head for raising the crop material from the ground surface and a transverse conveyor for laterally displacing the crop material, the transverse conveyor having an outboard discharge end, the windrow merger including:

an accelerator roller assembly, supported by said frame and in closely spaced relation with said outboard discharge end of said transverse conveyor and comprising a movable element and a drive operably coupled to the movable element, wherein the drive comprises a hydraulic drive motor operably coupled to the accelerator roller assembly to rotatably drive the accelerator roller assembly, the movable element being located such that said crop material leaving said outboard discharge end of the transverse conveyor is deposited onto said movable element, said accelerator roller assembly being actuated by said drive to accelerate said crop material deposited onto said movable element in an upward and outward direction.

2. The windrow merger of claim 1 wherein a pair of mounting brackets are receivable on respective sleeves mounted on said frame of the windrow merger to fix the position of said accelerator roller assembly relative to the discharge end of said transverse conveyor.

3. The windrow merger of claim 1, the accelerator roller assembly having a pair of mounting brackets, and a roller supported by the mounting brackets and operably coupled to the drive.

4. The windrow merger of claim 3 wherein each mounting bracket includes a respective arm which is received within a respective sleeve supported by said windrow merger frame.

5. The windrow merger of claim 4 wherein the mounting brackets provide support structure to support the drive.

6. The windrow merger of claim 1, in which the transverse conveyor imparts a first velocity and first direction to the crop material and the movable element imparts an acceleration to the crop material that imparts a second velocity and a second direction to the crop material.

7. The windrow merger of claim 3 wherein the accelerator roller assembly is rotatably mounted at the discharge end of the transverse conveyor, said accelerator roller assembly being in closely spaced relation to the discharge end of the transverse conveyor assembly such that discharged crop material is received and accelerated by the accelerator roller assembly.

8. A windrow merger for merging crop material disposed in a windrow on the ground surface, including a frame, a tongue for towing, a pickup head for raising the crop material from the ground surface and a transverse conveyor for laterally displacing the crop material, the transverse conveyor having an outboard discharge end, the windrow merger including:

an accelerator roller assembly, supported by said frame and in closely spaced relation with said outboard discharge end of said transverse conveyor and comprising a movable element and a drive operably coupled to the movable element, the accelerator roller assembly having a pair of mounting brackets, and a roller supported by the mounting brackets and operably coupled to the drive, wherein the drive is powered by a hydraulic drive motor located proximate the discharge end of said transverse conveyor of said windrow merger, the movable element being located such that said crop material leaving said outboard discharge end of the transverse conveyor is deposited onto said movable element, said accelerator roller assembly being actuated by said drive to accelerate said crop material deposited onto said movable element in an upward and outward direction.

9. The windrow merger of claim 8 wherein the drive includes a driven sprocket spaced apart from an idler sprocket and a rotatable continuous chain being borne on the driven sprocket and the idler sprocket.

10. The windrow merger of claim 9 wherein the driven sprocket is attached to a drive roller of the transverse conveyor.

11. A windrow merger for merging crop material disposed in a windrow on the ground surface, including a frame, a tongue for towing, a pickup head for raising the crop material from the ground surface and a transverse conveyor for laterally displacing the crop material, the transverse conveyor having an outboard discharge end, the windrow merger including:
an accelerator roller assembly, supported by said frame and in closely spaced relation with said outboard discharge end of said transverse conveyor and comprising a movable element and a drive operably coupled to the movable element, the accelerator roller assembly having a pair of mounting brackets, and a roller supported by the mounting brackets and operably coupled to the drive, wherein the movable element comprises at least one paddle extending outwardly from the roller assembly, the movable element being located such that said crop material leaving said outboard discharge end of the transverse conveyor is deposited onto said movable element, said accelerator roller assembly being actuated by said drive to accelerate said crop material deposited onto said movable element in an upward and outward direction such that discharged crop material is received and accelerated by the accelerator roller assembly.

12. The windrow merger of claim 11 wherein the at least one paddle is supported on a metal base plate.

13. An accelerator roller device for a windrow merger, the accelerator roller device for displacing and fluffing windrow crop material handled by said windrow merger, said device comprising:
an accelerator roller frame disposable in close relationship to a discharge end of a transverse conveyor assembly of the windrow merger, said accelerator roller frame supporting a roller with a plurality of paddles extending outwardly from said roller, said roller paddles being rotated by a sprocket and chain drive assembly that derives its power from a hydraulic conveyor motor, the roller paddles being positioned to receive windrow material from the discharge end of the transverse conveyor assembly of the windrow merger and to increase the velocity of the discharged windrow crop material and direct the windrow crop material upwardly and outwardly from the discharge end of the transverse conveyor assembly.

14. The accelerator roller device of claim 13 including a first mounting bracket for detachably coupling said accelerator roller device to said windrow merger, said first mounting bracket comprising a first arm slidably receivable within a first sleeve, said first sleeve adapted to be fixedly carried by said windrow merger supported by said accelerator roller frame.

15. The accelerator roller device of claim 14 wherein the first mounting bracket provides support structure to support the sprocket and chain drive assembly, including a second mounting bracket including a second arm slidably receivable within a second sleeve, said second sleeve adapted to be fixedly carried by said windrow merger.

16. The accelerator roller device of claim 15 wherein the mounting brackets provide support structure to support the roller assembly.

17. The accelerator roller device of claim 13 wherein each of said plurality of paddles comprises a metal base plate to which a rubber paddle is attached.

18. A method of displacing material in a windrow with a windrow merger having a crop material handling conveyor assembly and an accelerator assembly comprising:
picking the windrow material up off the ground at a point of pickup and onto the crop material handling conveyor;
operating the conveyor assembly to displace the windrow material relative to the point of pickup, and thereby imparting a first velocity to said windrow crop material;
transferring the windrow material from said conveyor assembly to said accelerator assembly, and operating said accelerator assembly by driving it with a hydraulic drive motor operably coupled to the accelerator roller assembly to rotatably drive the accelerator roller assembly, to impart a second velocity to said windrow material, said second velocity being at a speed that is faster than the speed of said first velocity, and in a direction that is upwardly from the direction of said first velocity, and
accelerating the windrow material both laterally and vertically whereby the windrow material is substantially fluffed and is transferred a substantial distance from the point of pickup.

19. A windrow merger for merging crop material disposed in a windrow or the ground surface, the windrow merger including a frame and a pickup head for raising the crop material from the ground surface, comprising:
a transverse conveyor assembly including a first means for imparting a first velocity and a first direction to the crop material; and
an accelerator roller assembly, supported by said frame and in closely spaced relation with an outboard discharge end of said transverse conveyor assembly, said accelerator roller assembly driven by a hydraulic drive motor operably coupled to the accelerator roller assembly to rotatably drive the accelerator roller assembly, the accelerator roller assembly including a second means for imparting an acceleration to the crop material, the acceleration imparting a second velocity to said crop material, said second velocity having a speed that is greater than the speed of said first velocity and a second direction that is upwardly relative to the first direction of said first velocity.

* * * * *